United States Patent
Denet

(10) Patent No.: US 7,763,332 B2
(45) Date of Patent: Jul. 27, 2010

(54) REMOVABLE FLEXIBLE MAGNETIC ACCESSORY FOR VEHICLE EXTERIOR

(76) Inventor: Scott Denet, 3603 James St., Shrub Oak, NY (US) 10588

( * ) Notice: Subject to any disclaimer, the term of this patent is extended or adjusted under 35 U.S.C. 154(b) by 0 days.

(21) Appl. No.: 12/129,015

(22) Filed: May 29, 2008

(65) Prior Publication Data

US 2008/0305283 A1 Dec. 11, 2008

Related U.S. Application Data

(60) Provisional application No. 60/942,113, filed on Jun. 5, 2007.

(51) Int. Cl.
*B60R 13/00* (2006.01)
*B32B 3/06* (2006.01)
*B62D 25/08* (2006.01)

(52) U.S. Cl. .............. 428/31; 40/600; 40/621; 280/727; 280/762; 296/1.07; 296/1.08; 428/900; 428/99; 428/542.2

(58) Field of Classification Search ............ 428/31; 296/1.07, 1.08; 280/727, 762; 40/413, 600, 40/621
See application file for complete search history.

(56) References Cited

U.S. PATENT DOCUMENTS

| | | | |
|---|---|---|---|
| 2,599,047 A | 6/1952 | Clark | |
| 3,147,176 A | 9/1964 | Haslam | |
| 3,659,887 A | 5/1972 | Marquette | |
| 3,665,355 A * | 5/1972 | Sasaki et al. | 335/306 |
| 4,310,978 A | 1/1982 | Stern | |
| D272,429 S | 1/1984 | Trombley et al. | |
| D289,891 S | 5/1987 | Bielby | |
| 4,663,874 A | 5/1987 | Sano et al. | |
| 4,775,559 A | 10/1988 | Kanamori | |
| D313,862 S | 1/1991 | Gaukler | |
| 5,158,324 A * | 10/1992 | Flesher | 280/770 |
| 5,503,891 A | 4/1996 | Marshall et al. | |
| 5,549,938 A * | 8/1996 | Nesbitt | 428/17 |
| 5,931,522 A | 8/1999 | Roskey | |
| 5,975,621 A * | 11/1999 | Lefevre | 296/136.07 |
| 6,217,958 B1 * | 4/2001 | Blyden et al. | 428/31 |
| 6,382,821 B1 * | 5/2002 | Heyer et al. | 362/509 |
| 6,852,385 B2 * | 2/2005 | Rattigan | 428/99 |
| 6,926,339 B2 | 8/2005 | Gentile | |
| 7,083,211 B1 | 8/2006 | Bores | |

(Continued)

FOREIGN PATENT DOCUMENTS

CA 2003879 5/1990

OTHER PUBLICATIONS

Mr. BodyKit.com advertisement, 5.0 Mustang & Super Fords Magazine, Jun. 2007; p. 39; Primedia Specialty Group, Inc., Los Angeles, California.

(Continued)

*Primary Examiner*—Aaron Austin
(74) *Attorney, Agent, or Firm*—Richard Pettus; Jonathan D. Ball; King & Spalding LLP

(57) ABSTRACT

Provided is an accessory for a aesthetically modifying the decklid of a vehicle. The accessory generally comprises of flexible laminated sheet or strip including a magnetic material which permits the accessory to be reversibly adhered to the decklid of the vehicle.

21 Claims, 4 Drawing Sheets

U.S. PATENT DOCUMENTS

| | | |
|---|---|---|
| 7,087,132 B2 | 8/2006 | Krey, Jr. |
| D539,200 S | 3/2007 | Chan |
| 2002/0058113 A1* | 5/2002 | Dimone .................... 428/31 |
| 2003/0024195 A1* | 2/2003 | Koh et al. ............. 52/506.01 |

OTHER PUBLICATIONS

Wilson, "Who's the Boss," 5.0 Mustang & Super Fords Magazine, Jun. 2007; pp. 62-68; Primedia Specialty Group, Inc., Los Angeles, California.

* cited by examiner

_US 7,763,332 B2_

REMOVABLE FLEXIBLE MAGNETIC ACCESSORY FOR VEHICLE EXTERIOR

This application claims priority to provisional application Ser. No. 60/942,113, filed Jun. 5, 2007, the contents of which are hereby incorporated by reference in their entirety.

FIELD OF INVENTION

The present invention relates generally to decorative and/or protective paneling, trim, and the like comprising flexible magnet materials for the exterior surfaces of a vehicle which can be readily removed and/or reinstalled by the user without risk of damage to the vehicle finish.

BACKGROUND OF THE INVENTION

Automobile enthusiasts often desire to customize the appearance of their vehicles, including to achieve certain "retro" or nostalgic design looks, by adding after-market trims, panels, accessories and the like. Historically, these looks have been achieved by costly professional paint jobs but in recent years these add-on products are typically attached to the exterior surface of the vehicle by bulky, relatively expensive permanent or semi-permanent methods or by methods which may damage the surface or finish of the vehicle and which are themselves prone to undesirable deterioration to their finish during normal usage. For example, U.S. Pat. No. 4,775,559, the disclosure of which is hereby incorporated by reference, discloses a decorative plate for the rear of a vehicle which is affixed to the vehicle by bolts extending through the vehicle's rear panel. The type of decorative panel exemplified by U.S. Pat. No. 4,775,559 suffers from several well-known disadvantages including, most notably, the fact that holes must be drilled through the vehicle paneling to accommodate the bolts, often times requiring the employ of costly auto body professionals, and irreversibly damaging the vehicle's paneling. Thus, if in the future the vehicle owner wishes to change to a different appearance, costly body remodeling and paint work may be required. Further, because of its hard, inflexible material, this type of mounting does not permit the decorative panel to lay flush against the vehicle panel and thus may allow dirt and debris to accumulate behind the decorative plate which can have undesired effects on the exterior look and finish of the area. The inability to achieve a flush fit also has the further drawback of creating undesirable gaps through which the underlying vehicle finish may be visible, which may detract from the desired appearance. Generally, these mountings must also be painted to achieve the final desired finish which may become scratched and chipped during normal operation of the vehicle, also resulting in a sub-optimal appearance.

Other decorative accessories have been affixed to vehicles using adhesive-tape, frequently double-sided foam tape, as described for example in U.S. Pat. No. 7,087,132, the disclosure of which is hereby incorporated by reference. Adhesive tapes, especially those capable of remaining adhered for an extended time and during adverse weather conditions, also are capable of damaging the paint or finish of the vehicle's exterior if removal of the accessory is desired. The adhesive may pull the finish off the vehicle panel, may discolor the vehicle's finish, or may leave a residue, such as adhered foam in the case of double-sided foam tape. Thus, these generally hard and inflexible accessories, which typically must be painted, suffer from the same drawbacks of expense, sub-optimal appearance and effects due to a non-flush fit and damage to the underlying vehicle finish upon removal.

Others have proposed embedding solid magnets in decorative or protective strips, paneling or the like such that the accessory may be reversibly adhered to the vehicle without causing damage thereto. For example, U.S. Pat. No. 3,147,176, the disclosure of which is hereby incorporated by reference, discloses a magnetic car door protector comprising a plurality of small, flat, powerful magnets embedded in a flexible strip. The use of solid magnets of the type described in U.S. Pat. No. 3,147,176 necessitates a substantial degree of thickness to the accessory strip which limits the range of applications and decorative features that are achievable.

Still others have attempted to apply sheets of plastic material similar to those used for adding tint to vehicle windows. These sheets are applied by way of an arduous, time-consuming and often frustrating process similar to wallpapering whereby adhesive is on one side of a sheet and a soapy solution and squeegee-like tool is used to attach it in the proper orientation with minimal bubble and wrinkles which result in a sub-optimal fit and appearance. This material also has poor wear resistance and is prone to scratching and other deterioration of the desired finish. Finally, it generally must be scraped off, resulting in damage to the underlying finish and the need for costly professional repair and re-painting.

Accordingly, there is a continuing need in the art for improved decorative and/or protective add-ons to vehicles which are wear-resistant, non-destructive, easy to apply, remove, and re-install and capable of a flush fit to the vehicle surface in order to support a wide range of decorative elements. It is therefore an object of the invention to provide decorative and/or protective strips, panels, and the like for modifying the exterior or a vehicle which overcome the foregoing deficiencies of the prior art.

SUMMARY OF THE INVENTION

In accordance with these and other objectives, the present invention provides thin decorative accessories (strips, panels, plates, etc.) for application to exterior surfaces of a vehicle which comprise flexible magnetic materials and which can be snuggly affixed, removed and re-installed to metallic exterior vehicle panels without risk of damage thereto. Advantageously, the inventive flexible magnetic accessories are capable of adhering to even the most exaggerated contours of the vehicle.

In one aspect of the invention, the decorative and/or protective accessory is adapted to identically fit the dimension of a recess formed between the tail lights on the rear end of a suitably configured vehicle. The recess between the tail lights may comprise the rear portion of the decklid. Suitably configured vehicles according to this embodiment include, without limitation, any of the Ford Mustang™ vehicles having the decklid configuration of the 2005-2007 models. The accessory according to the present invention can be adapted to identically fit the Mustang around the perimeter of the decklid, including the ornamental gas cap, without having to remove the cap as with other methods of the prior art.

In another aspect of the invention, a method for enhancing the appearance of a vehicle or for providing advertising thereon is provided which comprises affixing to the exterior of a vehicle a decorative and/or protective accessory according to the invention comprising a strip or panel of flexible magnetic material having cut-out portions therethrough in the form of one or more symbols or shapes (e.g., letters, logos, etc.) which cut-out portions reveal the surface of the vehicle.

These and other aspects of the invention may be more clearly understood by reference to the following detailed description of the invention, drawings, and the appended claims.

DETAILED DESCRIPTION

The removable flexible magnetic accessories of the present invention include as an essential component a flexible magnet material. Flexible magnets of the type used in common "refrigerator" magnets are generally known. Typically, a flexible magnet consists of a flexible sheet of plastic or rubber in combination with a magnetic material, such as ferrite metal powder particles, dispersed throughout, as described in, for example, Canadian Patent No. 2,003,879 and U.S. Pat. No. 5,503,891, the disclosures of which are hereby incorporated by reference. Flexible magnets may advantageously be made very thin (e.g., between 0.1 mm and 0.75 mm in thickness) as compared to traditional metal or alloy-based hard magnets and are conveniently provided in large sheets from which a desired custom shape may be cut.

Figure 1:
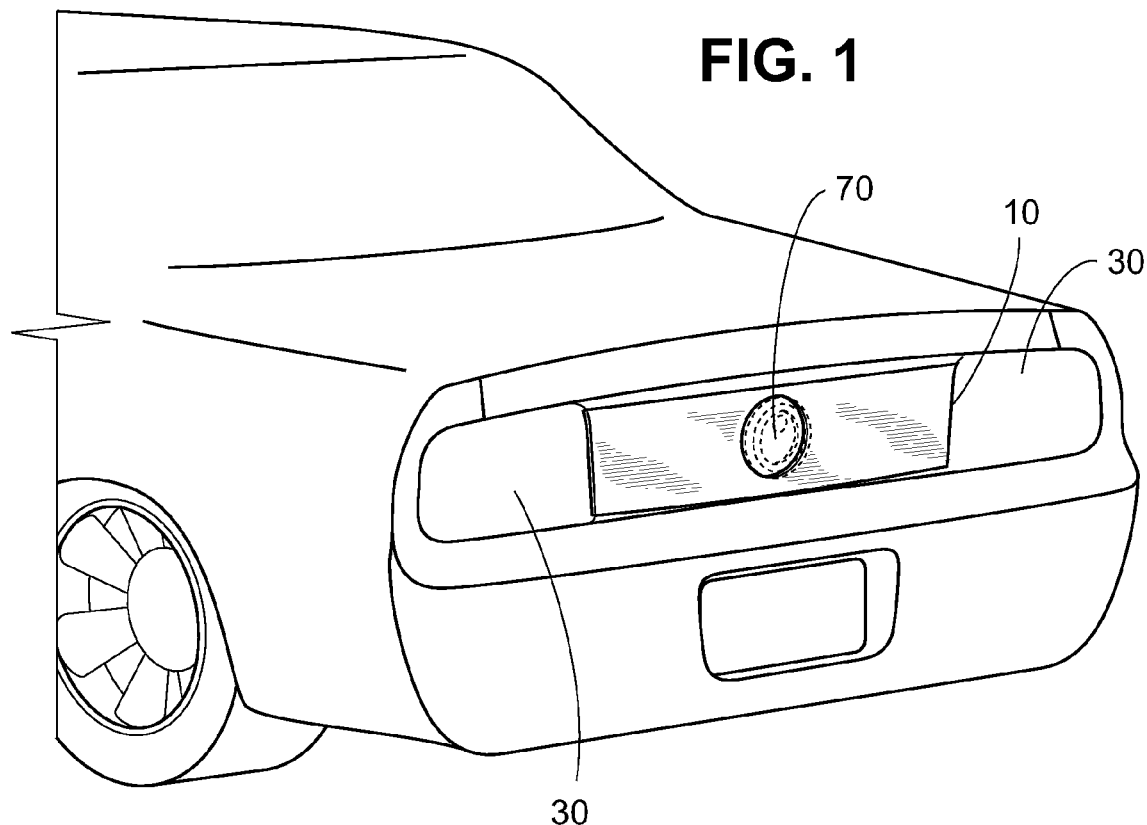
FIG. 1 shows a removable flexible protective and/or decorative accessory according to the invention applied to the recessed region of the decklid of a Ford Mustang™ having the decklid configuration of the 2005-2007 models.

Referring now to FIG. 1, a preferred embodiment of the present invention is shown as accessory 10 which is adapted to fit the dimensions of the recessed region of the decklid of a Ford Mustang™ having the decklid configuration of the 2005-2007 models (as shown), wherein the recessed region of the decklid defines a space between tail lights 30, and wherein accessory 10 has a cut-out hole of suitable dimensions to accommodate the mock decorative gasoline cap 70 of the vehicle which, in use, is disposed therethrough. When applied to a vehicle in the manner illustrated in FIG. 1, accessory 10 creates the appearance of "depth" between tail lights 30 which is a highly desired attribute to some car enthusiasts, including those interested in replicating certain "classic" design appearances. The sense of depth can be enhanced by providing accessory 10 in a dark color, preferably black, and with a matte finish. This effect is generally known as a decklid "blackout."

Figure 2:
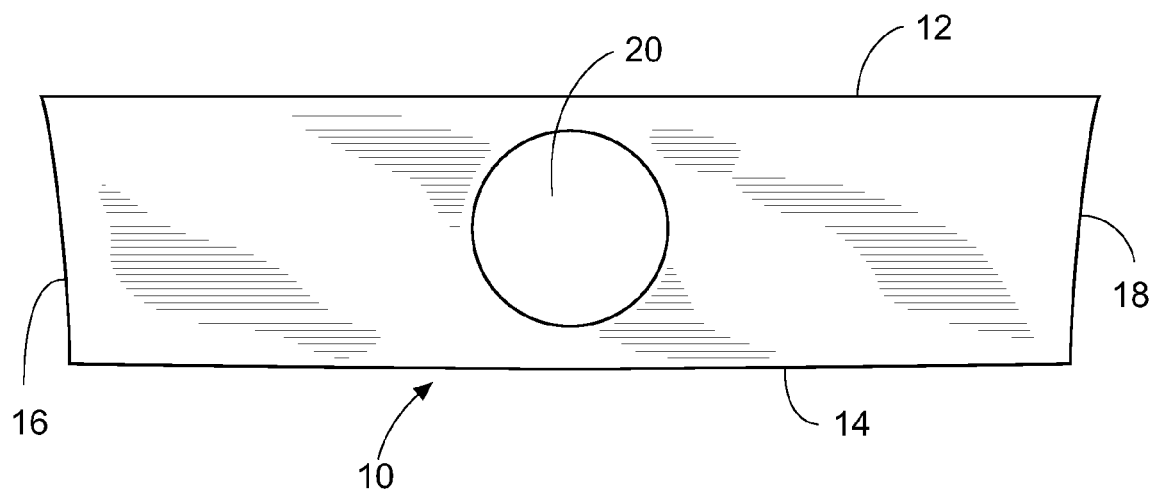
FIG. 2 is a front view of a protective and/or decorative accessory according to the invention configured to the dimensions of the recessed region of the decklid of a Ford Mustang™ having the decklid configuration of the 2005-2007 models.
Figure 2A:
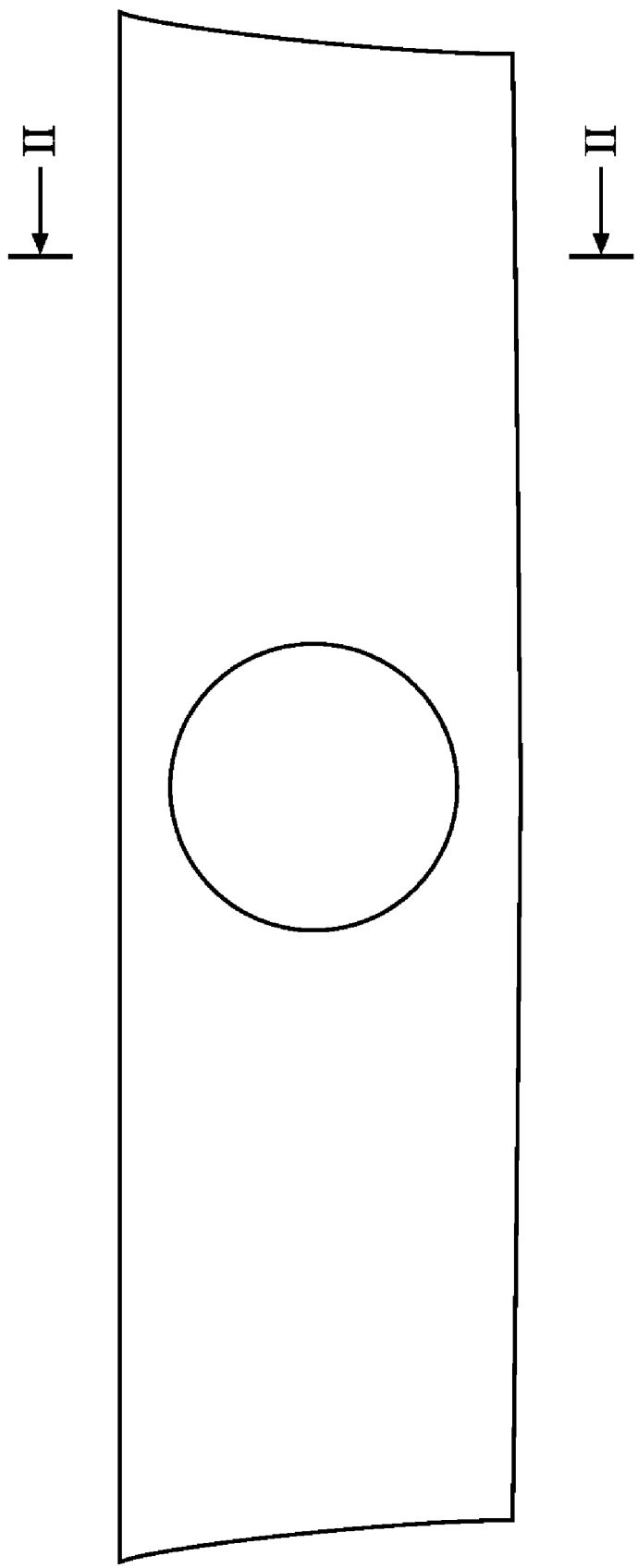
FIG. 2A shows the accessory of FIG. 2 with the dimensions indicated in inches.

Referring now to FIGS. 2 and 2A, accessory 10 comprises a sheet of flexible magnet material of approximately 0.03" (inches) in thickness, laminated on one side with vinyl film (not shown). Accessory 10 is approximately 31 13/16" wide at top edge 12 and approximately 30 1/8" wide at bottom edge 14 and has circular hole 20 cut therethrough suitably dimensioned (about 5 15/16" diameter) to fit around, and due to its flexibility and dimensioning, tucked under, the mock decorative gasoline cap (shown at 70 in FIG. 1) on the decklid of the above-described Ford Mustang™ so that there are no gaps through which the underlying vehicle finish is visible. Circular hole 20 is horizontally centered and vertically disposed such that the top edge of circular hole 20 ends 1" below top edge 12 of accessory 10. The left and right edges (16 and 18, respectively) of accessory 10 are configured with a slight concave curvature to identically match the contours of the decklid recess. Accessory 10 is approximately 8 9/32" high at the center with a gradual angling or curvature of the bottom edge 14 up to approximately 8 1/16" high at the left and right lower corners.

Figure 3A:
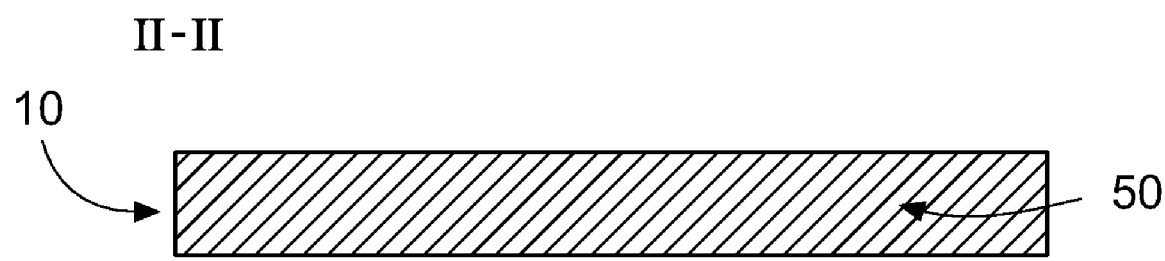
FIG. 3A shows a cross-sectional view of the accessory of FIG. 2 along the line II-II in an embodiment wherein the accessory is composed of a single layer of flexible magnet.
Figure 3B:
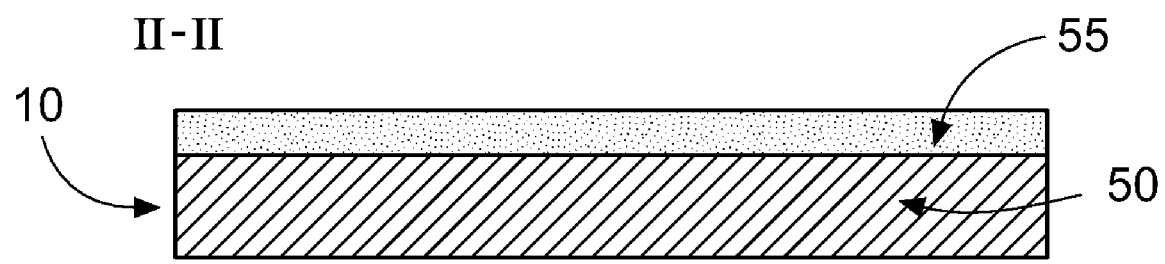
FIG. 3B shows a cross-sectional view of the accessory of FIG. 2 along the line II-II in a specific embodiment wherein the accessory comprises a layer of plastic or rubber laminated to a layer of flexible magnet.

In one embodiment, the flexible magnetic accessory is provided as a single layer of the magnetic material 50 as illustrated in FIG. 3A, which shows a cross-section of the flexible magnetic accessory 10 of FIG. 2A along the line II-II. Preferably, the flexible magnetic accessory 10 comprises a laminate of a layer of magnetic material 50 with a plastic or rubber layer 55, as illustrated in FIG. 3B, wherein the magnetic layer 50 faces and magnetically adheres to the metallic vehicle exterior during use. The addition of a plastic or rubber layer 55 permits a wider variety of colors and surfaces effects (smooth, shiny, metallic, matte, etc.) to be present, avoids the need for costly painting and related upkeep due to deterioration during usage, and may enhance the durability, water-resistance, etc. of the accessory. Laminated plastic or rubber layer 55 preferably comprises polyvinyl chloride (PVC) or like material. It is contemplated that carbon-fiber material may also be suitably employed. Additional laminated layers may optionally be included over a portion or all of the plastic or rubber layer to achieve additional surface effects. Accessory 10 will typically, though not necessarily, have a thickness of less than about 1/8 inch (inclusive of all layers), more typically between about 0.1 mm and about 2.5 mm, and preferably between about 0.5 and about 1 mm, including an exemplary embodiment having a thickness of about 0.75 mm.

In addition to a Ford Mustang™ having the decklid of the 2005-2007 model, the accessory of the present invention can be adapted to any number of vehicles having a similarly configured recess between the rear lights to provide the blackout effect, including without limitation, the Dodge Charger™, Dodge Caliber™, and several models of Ford trucks and other vehicles having metallic rear panels. It is within the skill in the art to configure the accessory to fit the rear end recess of any such vehicle.

In one embodiment of the invention, a method is provided for enhancing the appearance of a vehicle comprising applying thereto a flexible magnetic accessory according to the invention. Preferably, the flexible magnetic accessory comprises a laminate of flexible magnet layer with a layer of plastic or rubber (e.g., elastomer), wherein the plastic or rubber layer possess a color and/or texture which differs from the color and/or texture of the underlying vehicle panel to which it is magnetically adhered in a reversible manner (i.e., it can be removed and reapplied without damage or alteration to the vehicle). Alternatively, the accessory may be provided in the same color and/or surface texture (gloss, matte, etc.) as the vehicle panel such that the accessory does not alter the appearance of the vehicle but may provide protection against scratches, dents, rust, etc.

Figure 4:
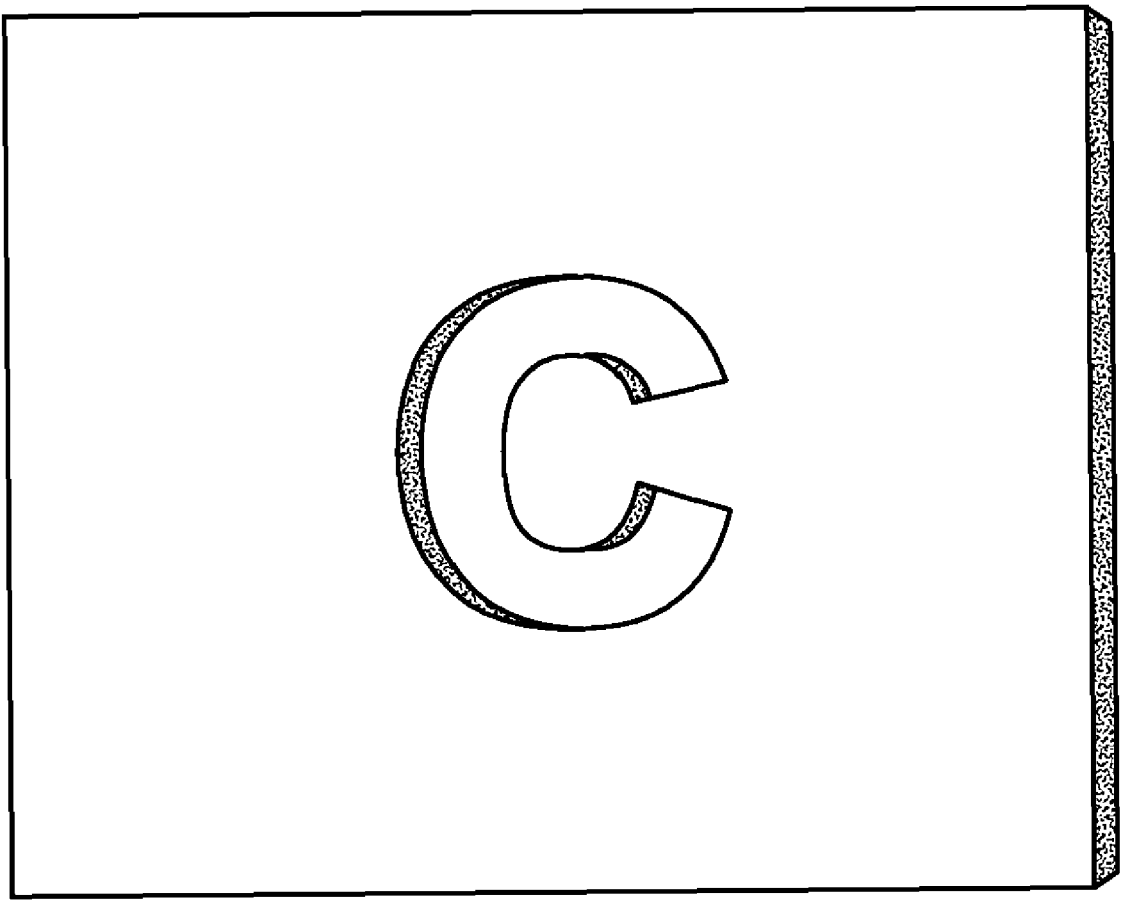
FIG. 4 illustrates an embodiment of the invention wherein a shape, in this case the letter "C", is cut out.

In one interesting embodiment, the accessory may have various shapes, including logos, pictograms, trademarks, symbols, letters, words, and the like, embossed therein or preferably cut-out such that when the accessory is affixed to the vehicle the underlying surface of the vehicle is visible through the cut-out space. Referring to FIG. 4, an accessory according to this embodiment is illustrated wherein the letter "C" is cut out. In this manner, the accessory may by personalized by the user to include any desired cut-out shape, for example, the car owner's name, or the vehicle's manufacturer (e.g., by cutting-out the letters "FORD"). Thus, the invention further provides a method for providing advertising on the exterior of a vehicle whereby logos, tradenames, trademarks and the like may be prominently displayed on the vehicle. In embodiments where shapes are cut out of the flexible magnetic accessory, it is preferably to provide the accessory in a different color and/or texture than the underlying car panel such that there exists sufficient contrast between the car panel and the accessory to visualize the shape.

The invention having been described by the foregoing description of the preferred embodiments, it will be understood that the skilled artisan may make modifications and variations of these embodiments without departing from the spirit or scope of the invention as set forth in the following claims.

The invention claimed is:

1. An accessory for imparting a blackout effect to the recessed portion of a vehicle decklid between the tail lights comprising:
   a unitary flexible laminated sheet or strip including a first layer of flexible magnetic material and a second layer of flexible plastic or rubber material,
   wherein said accessory has top and bottom edges and right and left edges, and is configured to match the dimensions of a recessed portion of a vehicle decklid between the tail lights, said top edge being approximately 31 13/16 inches wide and said bottom edge being approximately 30 1/8 inches wide, and includes a cut-out portion in the form of one or more symbols or shapes horizontally centered on said accessory, and wherein said accessory is capable of being reversibly adhered to a metallic decklid panel; and
   wherein the outer surface of said second layer has a dark color such that when the accessory is applied to the vehicle decklid the impression of depth in a recessed portion of a vehicle decklid between the tail lights is created or enhanced.

2. The accessory according to claim 1, wherein said cut-out portion is suitably dimensioned to fit around a gasoline cap of said vehicle.

3. The accessory according to claim 1, wherein said cut-out portion is in the form of a circular hole. pg,10

4. The accessory according to claim 1, wherein said left and right edges of said accessory are configured with a concave curvature to match the contours of the decklid recess.

5. The accessory according to claim 1, wherein the outer surface of said second layer has a matte finish.

6. The accessory according to claim 5, wherein said dark color is black.

7. The accessory according to claim 1, wherein the thickness of said laminated sheet or strip is between about 0.1 and about 2.5 mm.

8. The accessory according to claim 1, wherein the thickness of said laminated sheet or strip is between about 0.5 and about 1 mm.

9. The accessory according to claim 1, wherein said second layer comprises vinyl.

10. An accessory for imparting a blackout effect to the recessed portion of a vehicle decklid between the tail lights comprising:
   a unitary flexible laminated sheet or strip including a first layer of flexible magnetic material and a second layer of flexible plastic or rubber material,
   wherein said accessory has top and bottom edges and right and left edges, and is configured to match the dimensions of a recessed portion of a vehicle decklid between the tail lights, and includes a cut-out portion in the form of one or more symbols or shapes horizontally centered on said accessory, wherein said cut-out portion is in the form of a circular hole positioned one inch below the top edge of said accessory; and wherein said accessory is capable of being reversibly adhered to a metallic decklid panel; and pg,11
   wherein the outer surface of said second layer has a dark color such that when the accessory is applied to the vehicle decklid the impression of depth in a recessed portion of a vehicle decklid between the tail lights is created or enhanced.

11. An accessory for imparting a blackout effect to the recessed portion of a vehicle decklid between the tail lights comprising:
   a unitary flexible laminated sheet or strip including a first layer of flexible magnetic material and a second layer of flexible plastic or rubber material,
   wherein said accessory has top and bottom edges and right and left edges, and is configured to match the dimensions of a recessed portion of a vehicle decklid between the tail lights, and includes a cut-out portion in the form of one or more symbols or shapes horizontally centered on said accessory, wherein said cut-out portion is in the form of a circular hole having a diameter of about 5 15/16 inches; and wherein said accessory is capable of being reversibly adhered to a metallic decklid panel; and
   wherein the outer surface of said second layer has a dark color such that when the accessory is applied to the vehicle decklid the impression of depth in a recessed portion of a vehicle decklid between the tail lights is created or enhanced.

12. An accessory for imparting a blackout effect to the recessed portion of a vehicle decklid between the tail lights comprising:
   a unitary flexible laminated sheet or strip including a first layer of flexible magnetic material and a second layer of flexible plastic or rubber material,
   wherein said accessory has top and bottom edges and right and left edges, and is configured to match the dimensions of a recessed portion of a vehicle decklid between the tail lights, wherein said top edge is approximately 8 9/32 inches high at the center and approximately 8 1/16 inches high at the lower corners of said left and right edges, and includes a cut-out portion in the form of one or more symbols or shapes horizontally centered on said accessory, and wherein said accessory is capable of being reversibly adhered to a metallic decklid panel; and
   wherein the outer surface of said second layer has a dark color such that when the accessory is pg,12 applied to the vehicle decklid the impression of depth in a recessed portion of a vehicle decklid between the tail lights is created or enhanced.

13. The accessory according to claim 12, wherein said cut-out portion is suitably dimensioned to fit around a gasoline cap of said vehicle.

14. The accessory according to claim 13, wherein said cut-out portion is in the form of a circular hole.

15. The accessory according to claim 12, wherein said top edge is longer than said bottom edge.

16. The accessory according to claim 15, wherein said left and right edges of said accessory are configured with a concave curvature to match the contours of the decklid recess.

17. The accessory according to claim 12, wherein the outer surface of said second layer has a matte finish.

18. The accessory according to claim 12, wherein said dark color is black.

19. The accessory according to claim 12, wherein the thickness of said laminated sheet or strip is between about 0.1 and about 2.5 mm.

20. The accessory according to claim 19, wherein the thickness of said laminated sheet or strip is between about 0.5 and about 1 mm.

21. The accessory according to claim 12, wherein said second layer comprises vinyl.

* * * * *